April 25, 1939.  J. P. A. McCOY  2,155,435
TREATMENT OF FEED WATER FOR BOILERS AND THE LIKE
Filed April 14, 1930
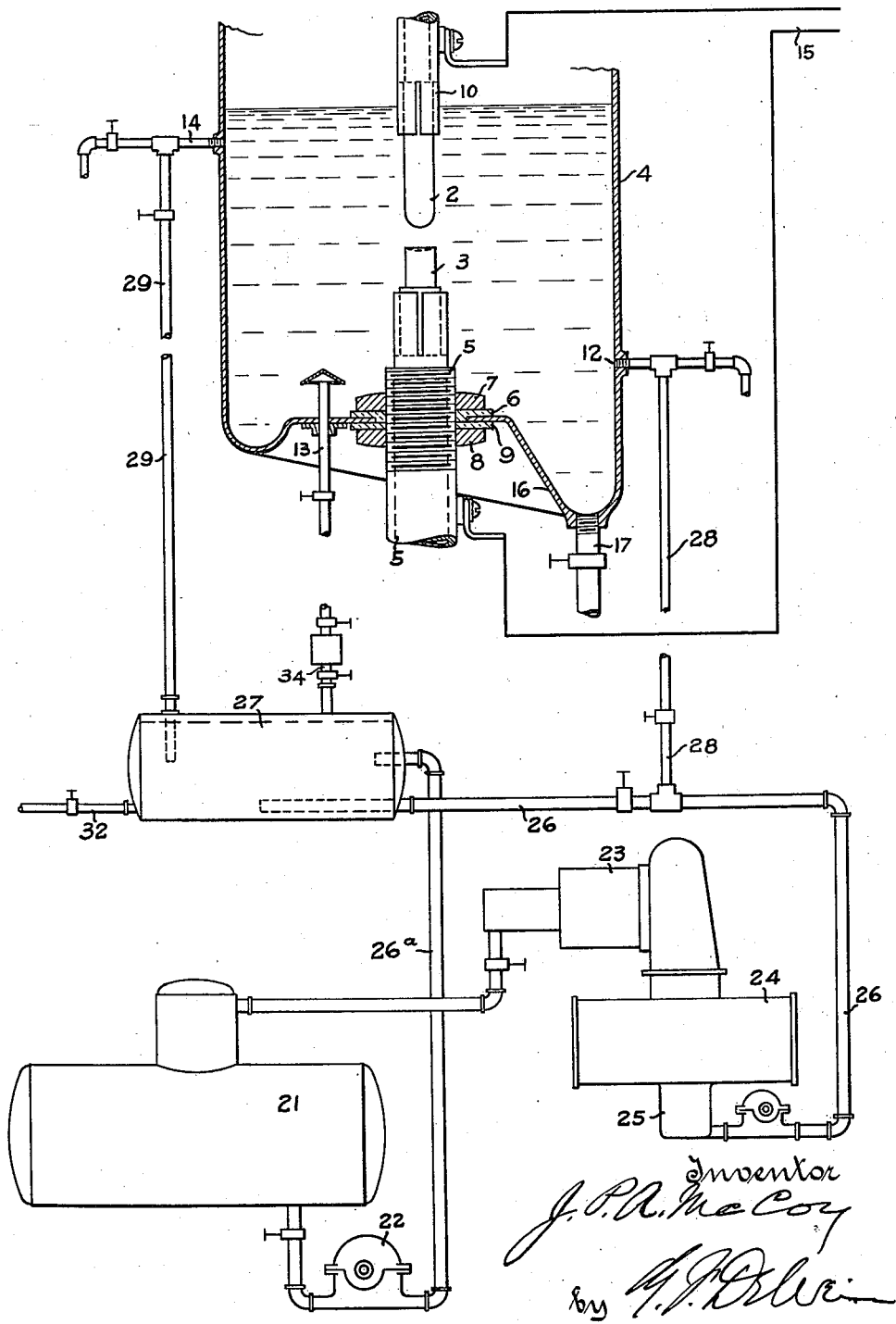
Inventor
J. P. A. McCoy
by
Attorney Patented Apr. 25, 1939

2,155,435

UNITED STATES PATENT OFFICE 2,155,435

TREATMENT OF FEED WATER FOR BOILERS AND THE LIKE

James P. A. McCoy, Milwaukee, Wis., assignor to Allis-Chalmers Manufacturing Company, Milwaukee, Wis., a corporation of Delaware Application April 14, 1930, Serial No. 444,064

10 Claims. (Cl. 210—16)

This invention relates in general to the treatment and conditioning of fluid in receptacles and systems, for the purpose of removing undesirable contents or characteristics of the fluid or products resultant from or incident to the presence of such fluid.

Features of the present invention are of more particular utility in connection with water and steam heating or conversion systems, particularly such systems as include apparatus for evaporating water to convert the same to steam under pressure, and for converting the latter to mechanical energy, and which may include apparatus for converting or assisting in the efficient re-conversion of the used steam to water for further use in the system.

In systems and plants for the production, utilization and re-conversion of steam, particularly for power purposes, many difficulties are present, arising from the presence of foreign matter, particularly solid and gaseous materials, in the feed water, this foreign matter indicating its presence through the formation of scale of varying characteristics in the boiler principally, and to some extent in other parts of the system, and the corrosion of parts of the boiler and other elements of the system; and the presence of dissolved gases, such as oxygen and carbon dioxide, in the steam, in addition to constituting a source of oxygen to promote or assist in corrosion of the boiler and turbine parts, prevents the attainment of the maximum degree of vacuum otherwise attainable in the condensing apparatus of the system.

The formation of scale in boilers and other parts of steam power or heating systems has long constituted a difficulty which has occasioned unreasonably high costs in operation of the system or plant, not only from the standpoint of labor and equipment expenses incident to the necessary treatment of feed water and periodic removal of scale and other sediment formed in the boiler and other parts of the system, but also from the standpoint of inefficient utilization of the energy of the fuel in evaporating the water where scale is present to any appreciable extent on the tubes and other surfaces of the boiler. The scale formation which clings tightly to the tubes and sheets of the boiler usually includes as its essential part calcium sulphate and calcium carbonate ordinarily in the form of a mixture of these salts; and it acts as a decided heat insulator.

Many expedients have been utilized in the prior art and with varying degrees of, but far from complete, success in attempts to eliminate the troubles resulting from sediment and scale forming materials in feed water. These expedients include the use of various chemical compounds and mixtures supplied to the feed water in the attempt to remove scale already formed in the boiler or like container, and to change the character of the foreign matter in the water so as to substantially reduce its scale-forming characteristics, and to remove oxygen-containing gases dissolved or occluded in the water.

While the expedient of passing water over or through iron filings or grindings for the purpose of removing occluded air or oxygen in feed water has long been known in the prior art, the practical results have been very incomplete in the matter of removing oxygen, primarily because the iron is in such condition that the surface exposed to contact with the gas is relatively small, and conditions are not otherwise most conducive to such removal. Likewise, iron and iron alloys have been introduced into the feed water in the form of ground particles, produced by the surface interaction of bodies of the material one upon another, or otherwise, this ground metal being supplied to the water entering the boiler, or actually injected into the boiler contents; but the results have been found at least wholly incomplete, primarily because of the fact that a great part of such metal particles supplied to the feed water are so large that they settle out of the water either before entering the boiler or in the latter; for as to those particles that do actually enter the boiler, the relatively large size of such particles is an obstacle to their remaining in suspension in the boiler; and, aside from this, the limited surface area of these particles does not promote the desired action or chemical combination with the oxygen dissolved or occluded in the feed water.

I have discovered that certain materials when passed, in a finely divided condition, of a reduced size corresponding to at least a colloidal state of subdivision, into the circulating medium of a water-steam system, have the remarkable and heretofore unlooked for property or characteristic of not only removing oxygen-containing gases dissolved or occluded in the feed water, but also of removing the scale theretofore formed or built up on and adhering to the surfaces or walls of the boiler or other containers or conduits of the system, and of preventing appreciable further formation of scale of a character which builds up through a cementing or crystallizing action on the surfaces of the boiler or other container.

Particularly favorable results along this line have been secured by me in connection with the use of oxidizable inorganic materials, and especially such as contain metals of the nickel group, particularly those having an atomic weight between 55 and 59, iron and nickel, especially the former, appearing to be well adapted for utilization in practicing my invention in a commercial manner. A characteristic of the more favorable materials for use in practicing this invention, is the ability of colloidal or smaller particles of the material to readily, but not too readily, chemically combine with the oxygen in the water; that is, there should be no appreciable tendency to decomposition of the water in the system by the colloidal particles under normal operating conditions in the system.

The colloidal or like medium for utilization in successfully practicing the invention may be prepared in accordance with the prior art knowledge of producing material of this character in a colloidal state of subdivision, the electric arc process having my present preference, particularly by reason of its relative simplicity and ready adaptability for being permanently associated in circuit with the water supply of a water-steam system, or at any desired intermediate point in the steam system, and the satisfactory results attainable with the products of such process.

Objects of the present invention include the provision of a novel apparatus and method of improving the operation of water-steam, and the like, systems in the matter of removing deleterious materials or ingredients, removing scale formation from and preventing or reducing the tendency to further scale formation upon portions of the fluid-containing system, such as boilers, turbines, condensers, pumps and piping.

More particular objects of this invention are concerned with securing the desired results in whole or in part through the use of an active material in an extremely fine state of subdivision, supplied to a portion of the system where the desired results are sought to be attained.

It is a further object of the present invention to utilize a metallic material in a reduced state of subdivision corresponding to at least a colloidal state and which is readily oxidizable under the temperature and pressure conditions available in the portion of the system where the desired results are sought to be attained, without appreciable decomposition of the water by such colloidal material.

It is a further object of the present invention to provide a novel apparatus and method for improving the operation of water-steam and the like systems in the matter of one or more of the items of removal of oxygen and other deleterious materials from the feed water, removal of scale already formed on the walls of receptacles forming a part of the system, and the prevention of further appreciable scale formation on these parts during continued operation of the system, wherein iron or equivalent material in a state of subdivision corresponding to at least colloidal condition is utilized as an active medium for securing the desired results.

The above and other objects and advantages are secured through the present invention, various novel features of which will be apparent from the accompanying description and drawing, disclosing an embodiment of features of the invention, and will be more particularly pointed out in the claims.

In the accompanying drawing, there is disclosed a diagrammatic showing of general features of apparatus for producing a mixture of colloidal material dispersed in water and for utilizing the same in a steam power system in connection with which the present invention is especially applicable.

In the utilization of the present invention for the purpose of treating the water of a steam power system, a mixture or dispersion in water of colloidal material, preferably iron by reason of its comparatively low cost and effectiveness in securing the desired results, may be prepared in a receptacle outside of the steam power system, the prepared mixture in the desired degree of concentration being then fed to the boiler or other apparatus or point of the system where it is particularly desirable that one or more of the essential and inherent effects of the colloidal iron mixture are sought to be secured.

While materials in a colloidal state may readily be produced in several manners, I find it satisfactory and convenient to produce colloidal material, such as colloidal iron, through the use of an electric current of suitable power producing an arc between electrodes, and this product is quite satisfactory in the practising of this invention. During passage of the electric current, either direct or alternating current, between metal electrodes so as to secure a sustained arc or a series of arcs between the electrodes, the heat of the arc vaporizes a small portion of the metal of the electrodes, and this vaporized metal is thereupon chilled and condensed in the form of small particles, a considerable part of a colloidal state of subdivision, and others in the form of larger sized particles, the latter being usually produced by reason of the condensation of several gaseous particles in contact with each other, or sometimes, when the current is high, by the melting or eroding of surface portions of the electrodes, the material thereof passing off in the form of small globules.

In order to facilitate the collection of the small particles of iron condensed from vapor formed by the electric arc, the electrodes are preferably immersed in water, the latter serving as a vapor-condensing agent and also as a means for collecting and holding in suspension the condensed colloidal particles and maintaining such particles in a medium where they are out of contact with the atmosphere or other substantial source of oxidation.

As indicated in the drawing, a pair of electrodes 2, 3 of suitable material, preferably cast iron, are mounted in suitable operative position within a tank or receptacle 4, a simple arrangement being one wherein the mounting tube or sleeve 5 of the lower electrode is detachably fixed in position in an opening in the bottom of the receptacle, as by having the mounting sleeve threaded at its upper end where it passes through an opening in the receptacle and insulated from the receptacle by means of a flanged insulating bushing 6, the flange portion of which acts as a separator between a nut 7 serving as an adjustable abutment at the upper side of the receptacle bottom. A second nut 8 threaded on the mounting sleeve 5 cooperates with the under side of the receptacle, through the intermediary of a packing washer 9 of insulating material, the arrangement being such as to serve not only to insulate the mounting sleeve 5 from the receptacle but also to form a water-tight seal about this mounting sleeve.

The mounting 10 for the upper electrode 2 may be provided with any of the well known arc-controlling devices of the general character of those heretofore used with arc lamps for automatically maintaining the desired length and intensity of arc, these devices being automatically responsive to a characteristic of the arc so as to maintain the desired length or intensity of the arc.

The receptacle 4 may be provided with an inlet or supply conduit 12, preferably communicating with the interior of the receptacle at the lower portion thereof, and a discharge conduit 13, here shown as being disposed at the lower part of the receptacle, preferably passing through the bottom thereof, and an auxiliary discharge conduit 14, preferably disposed adjacent the upper end of the receptacle, this latter discharge conduit being of more pronounced utility in connection with the operation of this apparatus as a part of a system for continuously preparing and feeding colloidal material dispersed in water to the water-steam system.

Current may be supplied to the electrodes 2, 3 from a source 15 of suitable voltage, an alternating current source, such as the secondary of a transformer, provided with means for varying the voltage thereof, being quite satisfactory.

During the continuation of the arc between the electrodes, particles of iron of a reduced state of subdivision corresponding to at least colloidal condition are produced as an incident of vaporization of particles of the electrodes, due to the heat of the arc, and the subsequent condensation of these vaporized particles, these particles being suspended or dispersed in the water in the receptacle. The ability of the water to retain colloidal iron in suspension may be increased to a considerable extent by the addition to the water of a small amount of peptizing agent, such as silicate of soda, this material itself being of a colloidal character, or other material effective to assist in maintaining the iron in a dispersed state.

During operation of the apparatus, particles of iron of appreciably larger size than correspond to a colloidal state of subdivision, may be formed by condensation of a number of gaseous particles in contact with each other, the resultant iron mass being of too great size to remain in suspension and accordingly settling to the bottom of the receptacle; or these larger particles may be formed by reason of the melting and erosion of surface portions of the electrodes and their dislodgment, these particles being chilled and hardened by the water as they separate themselves from the body of the electrode. The bottom of the receptacle 4 may be formed with a depressed outer portion of tapering depth, as indicated at 16, to facilitate the collection of the relatively larger sized particles of iron which do not go into suspension or dispersion but rather settle to the bottom of the receptacle. This depressed bottom may be provided with a discharge conduit, as indicated at 17, at its lowest point, to facilitate the removal from the receptacle of these larger particles of iron.

In order to promote a satisfactory condition for a combination of the production of minute iron particles and their collection as a part of the mixture in dispersed condition therein, it is desirable that the voltage and current in the arc circuit be not sufficiently high that relatively large globules of the electrodes are melted off, and that the water in the receptacle not be at a high temperature, for this latter condition promotes a relatively rapid rate of decomposition of the water into its component hydrogen and oxygen constituents, a condition which results in a portion of the colloidal iron particles produced by the arc combining with the oxygen constituent of the water to form oxides, and to some extent to form hydrated oxides or hydroxides, with consequent loss of some of the oxidizing and probably other effects of such originally formed colloidal iron particles. These colloidal metal particles will unite with the oxygen to probably more readily form ferrous iron which may be useful for at least some of the same purposes as colloidal iron itself. Further than this, a certain amount of the colloidal iron will, with oxygen present to appreciable extent in the receptacle 4, undoubtedly be changed to a ferric condition, a result which represents a considerable loss in efficiency of the colloid producing apparatus, that is, insofar as its ultimate use in treating the boiler water and scale deposits therefrom is concerned.

In order to secure satisfactory results in the preparation of the metal in a reduced state of subdivision corresponding to at least colloidal condition it is preferable to maintain the current density at less than fifteen amperes per square centimeter and to retain the voltage at as low a value as is consistent with maintaining the arc substantially continuous or in the form of rapidly recurring series of arcs; and it is preferable to maintain the temperature of the water as low as possible, a temperature below 60° C. being preferable.

The operation of forming the colloidal material may proceed to any desired degree of concentration, it not being difficult to readily secure a concentration of 5 to 10 grams or more of colloidal or finer iron dispersed in the water, per gallon, provided there is no substantial decomposition of the water. The mixture of colloidal iron and water of desired concentration may be dipped out of the receptacle 4 or drawn off through the discharge conduit 13 and stored for desired use in water heating or treating systems.

Where it is desired to transport the mixture of colloidal material dispersed in water in containers, any desired portion of the water may be evaporated from the mixture; and the resultant residue may later be used, with any desired degree of dilution prior to its being supplied to the feed water or the like.

The apparatus disclosed in the drawing for producing colloidal material dispersed in a liquid is illustrated as a unit of a water-steam system, including any number of the usual constituent elements of a modern system for producing steam, utilizing the same in a steam turbine, and condensing the exhaust steam of the turbine for further use in the boilers of the system. The colloid-producing apparatus is shown as being connected in the system in advance of the inlet to the boiler or battery of boilers 21, the latter supplying steam, directly or through a superheater or the like, to one or more steam turbines 23, from which the steam is exhausted to a condenser 24; and the condensate from the condenser is discharged to a hot-well 25, through the conduit 26, whence it is pumped or otherwise discharged through a section of pipe line 26 to a feed water heater from which it is forced by the pump 22 to the inlet to the boiler 21.

A section of the feed line 26 from the hot-well to the boiler is by-passed by the colloid-producing apparatus made up of the electrodes 2, 3 and the containing receptacle 4, along with appurtenant parts, the inlet 12 of this receptacle being connected through a conduit section 28 to the conduit section 26, and the discharge 14 of the receptacle 4 being connected to another point of the conduit section 26 nearer the inlet to the boiler 21 or, as indicated, directly to the feed water heater 27. The condensate fed from the hot-well 25 to the inlet of the boiler is supplemented to the desired extent by raw or suitably treated water from another source of supply, fed through the pipe line 32 to the boiler inlet or preferably, as indicated, to the feed water heater 27. The feed water heater 27 may also be provided with an inlet 34 through which batches of the colloid containing mixture may be supplied to the system.

Whether the colloid-producing apparatus be continuously or intermittently operated as a part of the water-steam system or be operated separately to produce batches of a mixture of water and colloidal metal, with or without oxygen derivatives therefrom, dispersed therein and of desired concentration, the mixture is supplied to the boiler or other portion of the water-steam system where it is particularly desired to remove air or oxygen-containing gas, to remove scale from the boiler walls or other surfaces, or to prevent or inhibit the formation of further scale of an adhering character; and the addition of this mixture constitutes a very definite and pronounced means for effecting the desired results. As will be apparent, the colloid-producing apparatus, as disclosed in the drawing, may be operated either as a batch apparatus, with shut-off valves in the conduit sections 28 and 29 closed, the colloidal iron mixture, when produced of the desired concentration, being then drawn off through the normal discharge 14 or the discharge conduit 13; and fresh batches of water may be successively supplied to the receptacle 4 through the inlet 14 or otherwise, for treatment in the form of a dispersion therein of the required amount of colloidal metal particles produced by the arc across the electrodes 2, 3.

Where the apparatus is operated as a continuous or intermittently operating part of the water-steam system disclosed, a regulated flow of condensate from the hot-well 25 is preferably maintained through the conduit 28 and the inlet 12, with its subsequent passage from the receptacle 4 through the discharge 14 and the conduit section 29, after being treated so as to include with the water a desired quantity of colloidal iron in dispersed condition therein, the degree of dispersion depending upon the amount of water passing through the by-pass made up of the receptacle 4 and the conduit sections 28, 29.

With the passage or injection of the iron in colloidal or equivalent state of subdivision, dispersed in water, into the boiler, its effects are shortly apparent upon the boiler and other parts of the system, by way of effecting the removal of the hard and tenacious scale ordinarily formed or built up upon the walls, sheets and tubes of the boiler, in the further tendency toward preventing or inhibiting the deposition of the sulphate, carbonate and probably other deposits in such a manner as promotes or assists the building up of this hard scale, and in the removal of dissolved oxygen or carbon dioxide or other oxygen-containing gas in the fluid contents of the boiler and other parts of the system. While these desirable effects produced through the treatment of the water-steam system with colloidal particles as described are much more noticeable in effect within the boilers, nevertheless, the effect is also decidedly pronounced in the steam turbine, where tendency to scaling, particularly such as may be incident to the presence of silica in the feedwater, and corrosion is very effectively reduced, and also in the condensing apparatus where the presence of oxygen or dissolved air militates against the attainment of the highest degree of vacuum in the system.

It is desirable that the amount of the material in colloidal or like form fed to the boiler or other part of the system be such as to take care to the desired extent of the several items or effects of (1) removing adhering scale theretofore formed and present in the boiler and other parts of the system, (2) conditioning the feed water as to the foreign matter therein, particularly solid particles, so as to insure the deposit of such particles, probably carbonates and sulphates principally, in such a manner as does not facilitate or permit the crystalline growth or building up of the heretofore decidedly objectionable combined sulphate and carbonate scale, and (3) reducing the oxygen-containing gases dissolved in the water in the boiler or other parts of the system. One or more of these effects may be produced in part through the changing of a portion of the colloidal iron particles to ferrous oxide or hydroxide within, or prior to entrance to, the boiler and the subsequent further oxidation of the same to ferric oxide or hydroxide.

It will be apparent that it is probably desirable to feed a greater amount of colloidal iron to the boilers in the initial stages of the treatment of the system, that is, before removal of, and for the purpose of effecting the removal of, the hard scale theretofore formed and present on the sheets and tubes of the boiler; for a certain portion of the colloidal iron supplied to the boiler appears to be required to effect this scale removal. When this hard scale is substantially removed from the surfaces of the boiler, the amount of colloidal iron may be reduced to some extent, substantial effects of the colloidal material thereafter being the conditioning of the water so as to prevent or substantially hinder further deposition of solids in the water in such form as serves to promote the building up of the hard combined sulphate, which appears to grow in crystalline form, and carbonate scale, and the removal of oxygen-containing gases dissolved in the water.

Instead of depending upon feeding sufficient colloidal iron mixture into the boiler, it may be satisfactory to inject a portion of this iron mixture at one or more additional points in the system beyond the boiler, particularly for the purpose of removing oxygen-containing gases in the steam turbine and condensing apparatus.

The amount of iron or like material to be supplied in the treatment of the water of any system would naturally depend upon the original condition of the boilers as to the scale formation therein at the time of beginning of the treatment, and the character of the raw water fed to the boilers, as to dissolved oxygen-containing gases and as to the amount of scale-forming solids in the water.

Instead of the specific electrical arc-producing apparatus hereinabove disclosed, arc-producing apparatus of the character of that disclosed in U. S. patent of O. F. Buss et al., No. 1,954,796, issued April 17, 1934, may be utilized for the purpose of producing the desired colloidal particles from the electrodes.

In the utilization of the present invention in connection with a steam power system evaporating from 2,000,000 to 3,500,000 lbs. of water per day, approximately two-thirds of which is in the form of condensate from the hot-well of the system and the remaining one-third is raw water having a relatively high content of oxygen and organic matter and calcium salts, quite satisfactory results have been attained in feeding to the water of the system approximately one-third to one-half pound of iron per day, in a colloidal or like minute state of subdivision, in dispersion in the water, the boilers of the system having been, through previous use of applications of colloidal iron, quite well freed of an original hard scale, probably made up in substance of a combination of calcium sulphate and calcium carbonate. With the above described treatment of the water of the system, that is, by feeding one-third to one-half pounds of iron per day, and assuming that the hard scale has been previously removed to a substantial extent, the steam and the condensate are substantially free of dissolved oxygen and carbon dioxide and there is no further deposit of the tenacious type of crystal like scale of calcium sulphate, probably with particles of calcium carbonate embedded therein.

The present effect of feeding the colloidal material, in addition to removing free oxygen and carbon dioxide, is to cause precipitated solids which would otherwise form and build up on the shell, sheets and tubes of the boilers and other parts of the system, in the form of a tenaciously adhering crystal like formation, to settle out or precipitate substantially in the form of a powdery or porous mass most of which is readily washed out of the boiler and deposited in the mud drums, the remainder forming on the metal surfaces in the form of a coating, more particularly apparent in the hotter portions of the boiler, which shortly removes itself by cracking and crumbling off, or can be readily washed off when the boiler is opened; and, in any event, this coating can be most readily removed from the tubes of the boiler by means of a turbine type cleaner. And the above described treatment is effective in an especially marked degree in preventing foaming and priming of the character that causes substantial carry-over of foreign matter with the steam leaving the boiler, this effect being particularly evidenced by comparatively clean condition of the steam traps and the blading of a steam turbine fed from the boiler where the treatment is in use.

The action of the colloidal or like particles of iron or the like when introduced into the system in the boilers or at other points, in removing the oxygen of air or other reducible gas is relatively obvious. Because of the minuteness of the oxidizable colloid particles, with their consequently great surface area available, and their thorough dispersion throughout the liquid particularly in the boiler under working conditions of high temperatures and pressures present therein, the oxidation of the iron is greatly facilitated. This oxidation, or a considerable portion thereof, is likely to be a two-step reaction, the initial change being from oxygen to ferrous oxide and probably hydroxide, particularly if there is any decomposition of water, and a subsequent change to the ferric condition of the oxide and the hydroxide. In any event, there is a substantial removal of the oxygen-containing gas theretofore present in the water.

The full details of the action of the iron or like material in a state of subdivision corresponding to at least colloidal condition, dispersed in the water, in removing the scale theretofore formed in the boiler and turbine or other parts of the system, and in substantially preventing or inhibiting the formation of further scale of this character, are not so apparent or readily explainable as to receive unanimous approval at the present time. In fact, several theories, plausible at least in part, have been offered for the results or phenomena attained in the above described method of utilization of the present invention; but applicant believes that the action is partly chemical and partly physical, chemical effects being involved in the change of the metallic iron particles to ferrous and ferric condition, and physical effects being involved in the action of the iron particles in the agglomeration of the impurities, like calcium carbonate and sulphate in the water in the boiler, thus suspending such impurities in such a manner that they can be readily blown down from the boiler with little or no tendency toward formation of scale of the hard and tenacious character which would otherwise form on the boiler surfaces, and possibly, particularly with respect to metallic iron, physical effects being involved in some action of the iron as a catalyst. However, independently of to what extent it is physical, and possibly dependent upon migration of negatively charged particles or ions of iron or the like, or derivatives thereof, or chemical, including oxidation within or behind the scale formation, or a combination of both physical and chemical, the fact remains that the effects exerted in removing the tenacious scale theretofore firmly adhering to the boiler shell and tube walls, particularly the tearing or blowing away of large pieces or bodies of this scale from their anchorage on the walls of the boiler parts, and the prevention or inhibition of further scale formation, are such as to cause one to marvel at the results attainable through the addition of a relatively small amount of this finely divided material like iron.

The action of the colloidal particles themselves, or an oxygen or other derivative thereof, in the treatment described, may possibly be in part that of a catalytic in causing the calcium sulphate to deposit or precipitate in something other than its normal crystalline fashion, either of itself or more probably with particles of calcium carbonate bound with the sulphate in such a manner as to reduce the brittleness of the ordinary calcium sulphate scale and the tendency toward forming scale of the ordinary cementing and tenacious character of the combined carbonate and sulphate scale. In any event, through the action of the iron or equivalent material, in its colloidal or minute state of subdivision, and wholly aside from the action of this material in actually removing scale theretofore present, there is evidenced a decided factor of prevention or inhibition of the depositing of solids in such a fashion as to form the tenacious type of scale which gradually builds up on the walls of the boiler parts to such a thickness as to seriously reduce the boiler capacity and to greatly reduce the efficiency of the system. And it is definitely indicated that, with a portion of the originally metallic colloidal particles, formed through the action of an electric arc immersed in a neutral bath such as water, and thereafter changed to a ferrous condition, the particular volume of water in which the colloidal particles are suspended or dispersed is capable of suspending an appreciably greater percentage of colloidal metallic iron particles than could be suspended in such water if the iron particles in ferrous condition were not present; and these hydrous oxide particles of iron, present as a part of the mixture in suspension, likewise have a highly beneficial action in preventing or inhibiting the formation of undesirable scale on the boiler surfaces.

While advantages and characteristics of the present invention have been described more particularly in connection with the utilization of iron in its minute state of subdivision, it will be apparent that other materials are of beneficial application to varying extents for the purpose of effecting one or more of the desirable results described hereinabove; and particularly materials like nickel which are of an atomic weight very close to that of iron and are apparently oxidizable under substantially the same conditions as iron, particularly without effecting an appreciable decomposition of the water under the operating conditions of the water-steam system, have been used with considerable success.

It should be understood that the invention described hereinabove is not limited to the exact details of materials, apparatus, operating effects, process steps or characteristics described hereinabove, for obvious modifications will occur to persons skilled in the art, and it is intended that the invention include all such modifications and applications involving novelty as are within the scope of the appended claims.

It is claimed and desired to secure by Letters Patent:

1. A process of treating water fed to boilers or the like to remove scale therefrom and inhibit further formation of scale thereon, which consists in supplying to said water a material containing a small amount of iron in a reduced state of subdivision corresponding to at least colloidal condition and in association with an agent effective to assist in maintaining said iron in dispersed condition in the water.

2. A process of treating water fed to boilers or the like to remove scale therefrom and inhibit further formation of scale thereon, which consists in supplying to said water a small amount of one or more metals of the iron group having an atomic weight between approximately 55 and 59 in a reduced state of subdivision corresponding to at least colloidal condition and which is a product of the vaporization by an electric arc and subsequent condensation of particles of an electrode containing said metal while immersed in water.

3. A process of removing scale from interior surfaces of boilers and like liquid-containing receptacles and inhibiting the formation of further scale thereon, which consists in supplying to the receptacle a substance including as its essential ingredient one or more metals of a group consisting of iron and nickel in a reduced state of subdivision corresponding to at least colloidal condition.

4. A process of treating water fed to boilers or the like to modify characteristics thereof and deposits therefrom, which consists in supplying to said water a material including as an essential ingredient thereof one or more metals of the iron group having an atomic weight between approximately 55 and 59 in a reduced state of subdivision corresponding to at least colloidal condition and an oxide of the metal.

5. A process of treating water fed to boilers or the like to modify characteristics thereof and deposits therefrom, which consists in supplying to said water a material including as an essential ingredient thereof iron in a reduced state corresponding to at least colloidal condition and ferrous oxide.

6. A process of removing scale from the interior surfaces of boilers and like liquid-containing receptacles and inhibiting the formation of further scale thereon, which consists in supplying to the receptacle a small amount of colloidal iron which is a product of disintegration of an electrode containing iron by means of an electric arc while immersed in water.

7. A process of treating feed water of boilers and the like, consisting in producing a continuous flow to the boiler or the like of a liquid with a substance in a reduced state of subdivision corresponding to at least colloidal condition dispersed in said liquid, said substance containing iron in elemental form and an oxide of iron.

8. In combination with a system for converting water to steam, a liquid-containing receptacle, means for supplying a stream of liquid to said receptacle, means for producing within said receptacle free and uncombined metallic colloidal particles of an oxidizable metal of the iron group having an atomic weight between approximately 55 and 59 in dispersed phase in the liquid in said receptacle, and means for transporting from said receptacle said liquid with said colloidal particles dispersed therein and continuously feeding the same to a portion of said system.

9. In combination with a system for converting water to steam, a liquid-containing receptacle, means for supplying a stream of liquid to said receptacle, means operated by an electric arc for producing within said receptacle colloidal particles of an oxidizable metal of the character of iron in dispersed phase in the liquid in said receptacle, and means for transporting from said receptacle to a portion of said system said liquid with said colloidal particles dispersed therein.

10. The method of preventing the formation of scale within a boiler, which consists in adding colloidal metallic iron to the boiler water.

JAMES P. A. McCOY.